(12) United States Patent
Shivalinga et al.

(10) Patent No.: US 10,450,066 B2
(45) Date of Patent: Oct. 22, 2019

(54) LOCK ASSEMBLY WITH ROTATING INNER PAWL

(71) Applicant: GOODRICH CORPORATION, Charlotte, NC (US)

(72) Inventors: Vinodkumar Shivalinga, Karnataka (IN); Narain Jayaprakash, Karnataka (IN)

(73) Assignee: GOODRICH CORPORATION, Charlotte, NC (US)

(*) Notice: Subject to any disclaimer, the term of this patent is extended or adjusted under 35 U.S.C. 154(b) by 162 days.

(21) Appl. No.: 15/584,272

(22) Filed: May 2, 2017

(65) Prior Publication Data
US 2018/0222586 A1 Aug. 9, 2018

(30) Foreign Application Priority Data
Feb. 9, 2017 (IN) .............................. 201711004708

(51) Int. Cl.
| | |
|---|---|
| *B60P 7/08* | (2006.01) |
| *B64D 9/00* | (2006.01) |
| *B60P 7/10* | (2006.01) |
| *B60P 7/13* | (2006.01) |

(52) U.S. Cl.
CPC ............ *B64D 9/003* (2013.01); *B60P 7/0892* (2013.01); *B60P 7/10* (2013.01); *B60P 7/13* (2013.01); *B64D 9/00* (2013.01)

(58) Field of Classification Search
CPC .. B60P 7/13; B60P 7/0892; B60P 7/10; B64D 9/003; B64D 9/00
USPC ............ 410/69, 77, 78, 80, 92, 94; 248/503; 244/118.1, 137.1; 414/536
See application file for complete search history.

(56) References Cited

U.S. PATENT DOCUMENTS

| | | | |
|---|---|---|---|
| 3,693,920 A * | 9/1972 | Trautman ............... | B64D 9/003 410/77 |
| 8,845,249 B2 * | 9/2014 | Rowles ................. | B60P 7/0815 410/105 |
| 2003/0170088 A1* | 9/2003 | Huber ...................... | B64C 1/20 410/77 |

* cited by examiner

*Primary Examiner* — Stephen T Gordon
(74) *Attorney, Agent, or Firm* — Cantor Colburn LLP

(57) ABSTRACT

A lock assembly includes a pawl body having first restraint surface and a second restraint surface, wherein the pawl body rotates between an extended position and a retracted position, an inner pawl rotatably coupled to the pawl body, wherein the inner pawl is rotated away from the second restraint surface in the retracted position of the pawl body, and a biasing member associated with the inner pawl, wherein the biasing member urges the inner pawl to be aligned with the second restraint surface in the extended position of the pawl body.

19 Claims, 8 Drawing Sheets

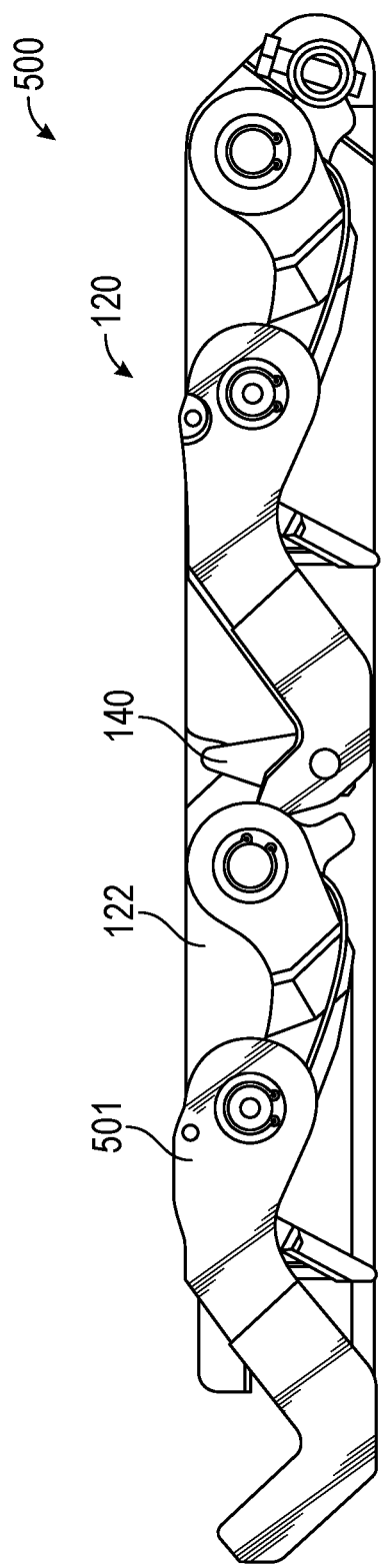

LOCK ASSEMBLY WITH ROTATING INNER PAWL

CROSS-REFERENCE TO RELATED APPLICATION

The application claims priority to and the benefit of Indian Patent Application No. 201711004708 filed on Feb. 9, 2017, and all the benefits accruing therefrom under 35 U.S.C. § 119, the content of which is incorporated herein in its entirety by reference.

BACKGROUND

The subject matter disclosed herein relates to locking assemblies for unit load devices, and more particularly, to pawl assemblies with rotating inner pawls for use with locking assemblies.

Cargo handling systems are typically used in a variety of applications to move or situate cargo in a particular area of a vehicle, such as a ship, truck, or aircraft. Pawls in lock assemblies are utilized in cargo handling systems to lock unit load devices, such as pallets or containers, within a cargo compartment of a vehicle. Often, design parameters and operating conditions may make operation of the pawls in lock assemblies difficult for operators during loading and unloading of cargo.

BRIEF SUMMARY

According to an embodiment, a lock assembly includes a pawl body having first restraint surface and a second restraint surface, wherein the pawl body rotates between an extended position and a retracted position, an inner pawl rotatably coupled to the pawl body, wherein the inner pawl is rotated away from the second restraint surface in the retracted position of the pawl body, and a biasing member associated with the inner pawl, wherein the biasing member urges the inner pawl to be aligned with the second restraint surface in the extended position of the pawl body.

According to an embodiment, a cargo handling system for use with a unit load device includes a lock assembly, including a pawl body having first restraint surface and a second restraint surface, wherein the pawl body rotates between an extended position and a retracted position, inner pawl rotatably coupled to the pawl body, wherein the inner pawl is rotated away from the second restraint surface in the retracted position of the pawl body, and a biasing member associated with the inner pawl, wherein the biasing member urges the inner pawl to be aligned with the second restraint surface in the extended position of the pawl body, and the unit load device engages the pawl body and the inner pawl when the pawl body is in the extended position.

Technical function of the embodiments described above includes that the inner pawl is rotated away from the second restraint surface in the retracted position of the pawl body, and a biasing member associated with the inner pawl, wherein the biasing member urges the inner pawl to be aligned with the second restraint surface in the extended position of the pawl body.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

FIG. 5A is a partial elevation view of an embodiment of a combined lock assembly with the pawls in a retracted position;

DETAILED DESCRIPTION

Figure 1:
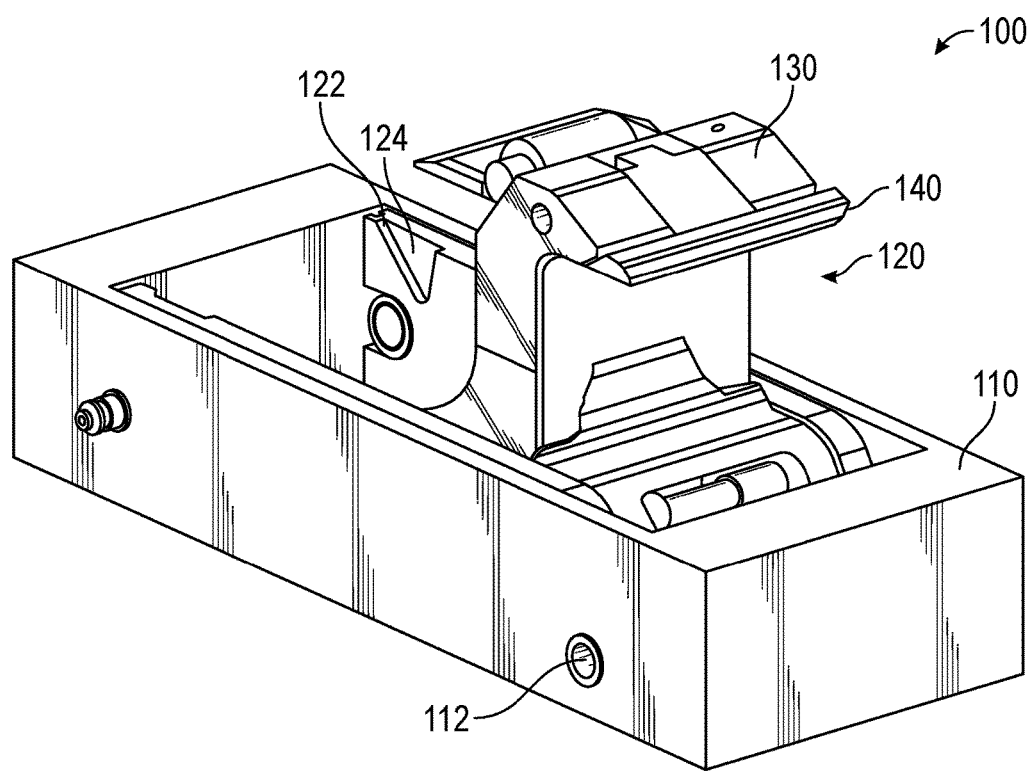
FIG. 1 is an isometric view of an embodiment of a lock assembly in a panel.

Referring to the drawings, FIG. 1 shows a cargo handling system 100 with a lock assembly 120 disposed within a panel body 110. In the illustrated embodiment, the lock assembly 120 including side plates 122, an inner pawl 140, an outer pawl assembly 130. In the illustrated embodiment, the lock assembly 120 can be used in conjunction with a cargo handling system 100 in a vehicle, including, but not limited to an aircraft. The lock assembly 120 may be mounted to a cargo floor, a cargo wall, or any other suitable location of a cargo area of the vehicle. In the illustrated embodiment, the inner pawl 140 and the outer pawl assembly 130 of lock assembly 120 can engage with a unit load device to lock the unit load device in place when the inner pawl 140 and the outer pawl assembly 130 of lock assembly 120 is in an extended/erected position. Unit load devices can load luggage, freight, mail, or any other suitable cargo within the vehicle. Further, in the illustrated embodiment, the inner pawl 140 and the outer pawl assembly 130 of lock assembly 120 can be retracted to allow clearance for cargo to move freely. Advantageously, the use of the inner pawl 140 within the outer pawl assembly 130 allows for operators/cargo handler to easily operate the inner pawl 140 and the outer pawl assembly 130 of lock assembly 120 within the cargo area of the vehicle.

In the illustrated embodiment, the lock assembly 120 is installed within a panel body 110 or any other suitable location within the cargo handling system of the vehicle. In the illustrated embodiment, the panel body 110 is located along the walls/floor of the cargo area. The lock assembly 120 can be fastened to the panel body 110 with fasteners 112.

Figure 2A:
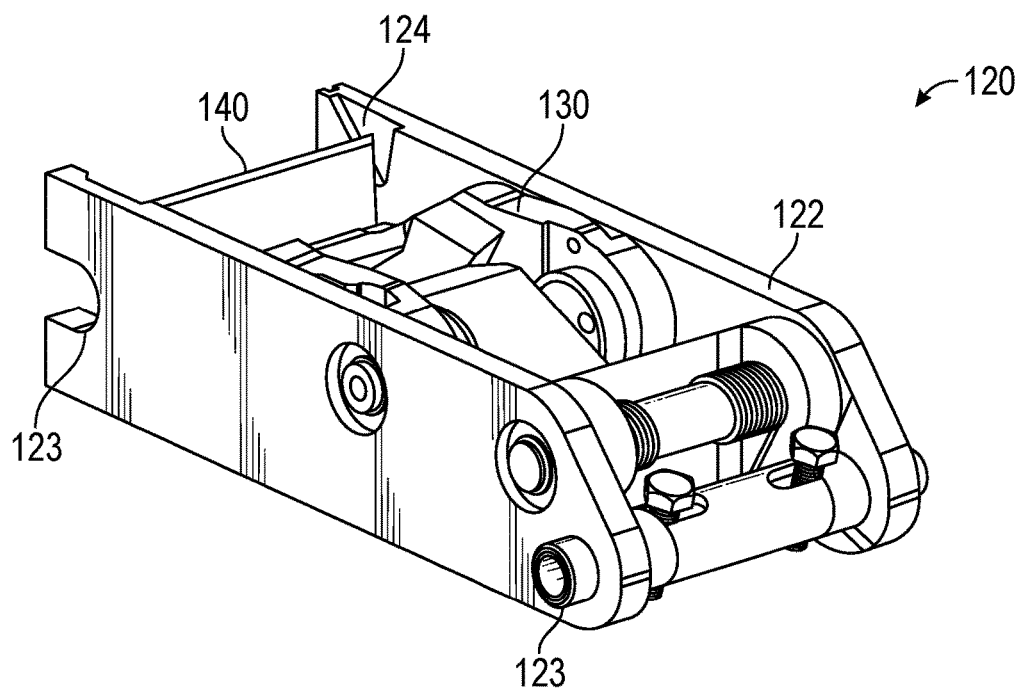
FIG. 2A is an isometric view of a lock assembly in a retracted position for use with the lock assembly of FIG. 1.
Figure 2B:
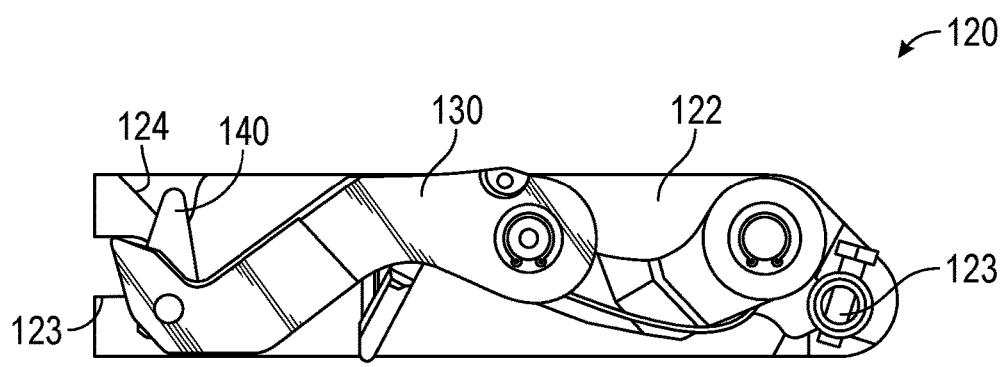
FIG. 2B is a partial elevation view of the lock assembly of FIG. 2A.

Referring to FIGS. 2A and 2B, the lock assembly 120 is shown. In the illustrated embodiment, the lock assembly 120 includes side plates 122, an inner pawl 140 and the outer pawl assembly 130. In the illustrated embodiment, the lock assembly 120 can be affixed within cargo handling systems within cargo areas of a vehicle.

In the illustrated embodiment, the side plates 122 contain the inner pawl 140 and the outer pawl assembly 130. In the illustrated embodiment, the side plates 122 include fastener features 123 and a guide surface 124. In the illustrated embodiment, the side plates 122 are formed from metal or any other suitable material. Components of the lock assembly 120 are fastened and allowed to pivot with respect to the side plates 122. In the illustrated embodiment, the fastener features 123 are holes, slots, etc., that allow the lock assembly 120 to receive fasteners to be affixed to the cargo handling system within the vehicle. In certain embodiments, the fastener features 123 can further allow components of the lock assembly 120 to pivot or rotate as needed for operation.

In the illustrated embodiment, the side plates 122 include guide surfaces 124. During operation, the guide surfaces 124 allow the protrusion 143 of the inner pawl 140 to be directed to a retracted position as the outer pawl assembly 130 is placed in a retracted position. In certain embodiments, the guide surface 124 is a recessed area that receives/guides the protrusion 143 of the inner pawl 140 as described herein. As the outer pawl assembly 130 is retracted, the inner pawl 140 remains in the area defined by the guide surfaces 124.

Figure 3A:
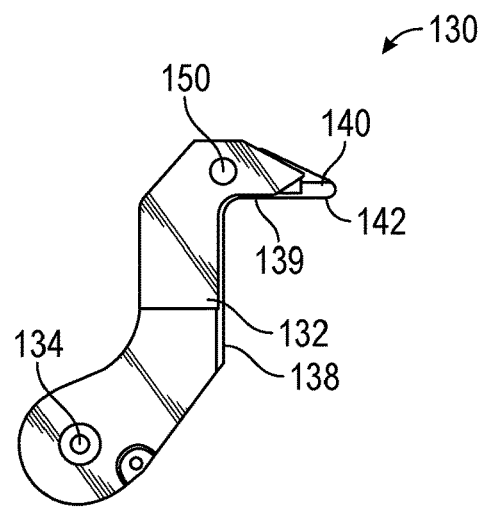
FIG. 3A is an elevation view of a pawl in an extended position for use with the lock assembly of FIG. 2A.
Figure 3B:
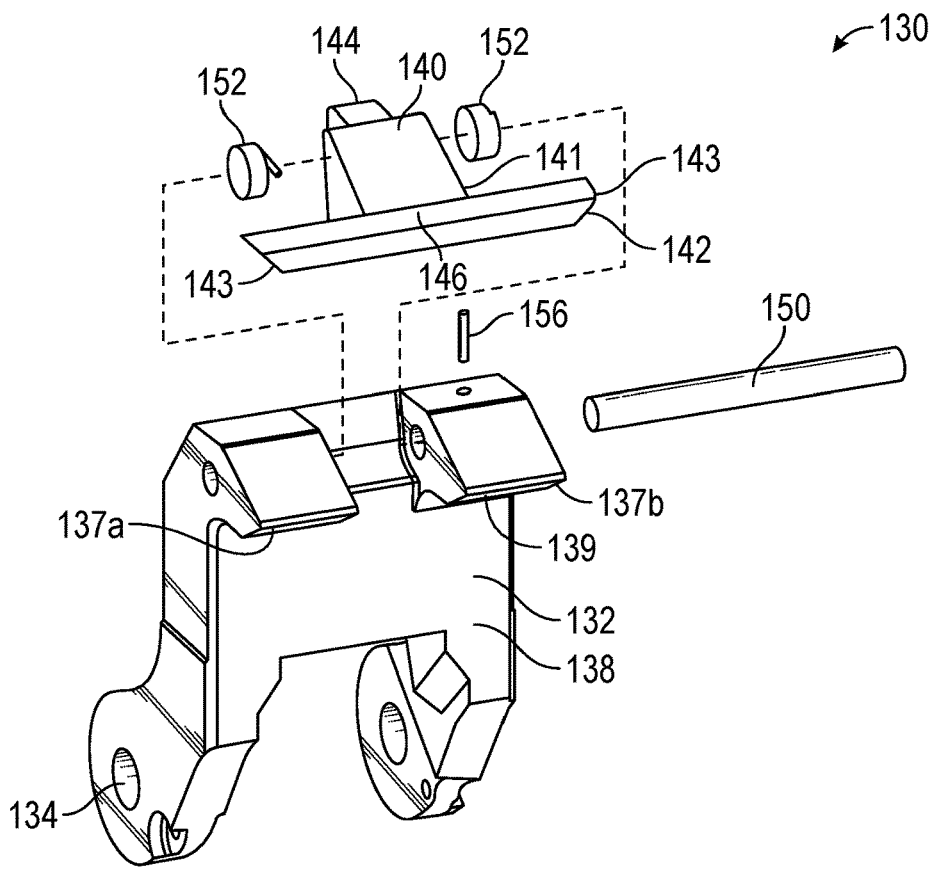
FIG. 3B is an exploded isometric view of the pawl of FIG. 3A.

Referring to FIGS. 3A and 3B, the outer pawl assembly 130 is shown. In the illustrated embodiment, the outer pawl assembly 130 includes a pawl body 132, the inner pawl 140, torsion springs 152, a shaft 150 and a spring pin 156. Pawl body 132 has a pivot hole 134, inner pawl surfaces 137a, 137b, an X or Y-restraint surface 138, and a partial Z-restraint surface 139. In the illustrated embodiment, the outer pawl assembly 130 can be rotated and deployed to engage with a unit load device to lock a unit load device in place, and further retracted to provide clearance.

In the illustrated embodiment, the pawl body 132 can be formed from metal or any other suitable material. The pawl body 132 can pivot about a pivot hole 134. In the illustrated embodiment, the pawl body 132 can be rotatably attached to the side plates 122 via the pivot hole 134.

In the illustrated embodiment, the pawl body 132 retains the unit load device by preventing movement in two planes. The X or Y-restraint surface 138 engages the unit load device to prevent movement along the X or Y-plane depending upon the orientation of the lock assembly 120. The Z-restraint surface 139 prevents movement along the Z plane relative to the pawl body. In the illustrated embodiment, the Z restraint surface 139 is a partial restraint surface as the inner pawl 140 is further utilized to restrain the unit load device in a Z plane. By utilizing a partial restraint surface for the Z restraint surface 139, greater clearance for the pawl body 132 can be achieved.

In the illustrated embodiment, the inner pawl 140 can be received by the inner pawl surfaces 137a, 137b. Referring to FIG. 3B, the inner pawl 140 is shown. In the illustrated embodiment, the inner pawl 140 includes an inner pawl body 141 with an inner pawl Z restraint surface 142, a pivot hole 144, protrusion 143, and an indentation/gripping pocket 146. The inner pawl 140 can pivot about a pivot hole 144. In the illustrated embodiment, the inner pawl 140 can be rotatably attached to the pawl body 132 via a shaft 150 with torsion springs 152.

In the illustrated embodiment, the inner pawl body 141 can be formed from any suitable material. The inner pawl body 141 includes an inner pawl Z restraint surface 142. In the illustrated embodiment, when extended, the inner pawl Z restraint surface 142 can supplement the Z restraint surface 139 of the pawl body 132. By extending the Z restraint surface 139 of the pawl body 132, the inner pawl Z restraint surface 142 can effectively prevent the movement of unit load devices along the Z plane. Further, since the inner pawl 140 is rotatably attached to the pawl body 132, the inner pawl 140 can further be retracted to allow for greater clearance when needed.

In the illustrated, embodiment, the inner pawl 140 includes protrusions 143 that engage the guide surface 124 of the side plate 122 as the outer pawl assembly 130 is retracted. In a non-limiting embodiment the inner pawl 140 can have protrusions 143 on both side or one only one side. In the illustrated embodiment, the inner pawl 140 can be folded inward by the guide surface 124 when the outer pawl assembly 130 is retracted within the side plate 122. When the outer pawl assembly 130 is extended or rotated out of the side plate 122, the inner pawl 140 can be rotated outward to be aligned with the Z restraint surface 139 to allow for an extended restraint surface of both the inner pawl Z restraint surface 142 and the Z restraint surface 139 of the pawl 130. In the illustrated embodiment, the pre-tension in torsion springs 152 will keep both Z restraint surface 142 of inner pawl 140 and Z restraint surface 139 of pawl body 132 aligned in same plane.

In the illustrated embodiment, the inner pawl body 141 can include a gripping pocket 146 which provides the necessary grip for operator/cargo handler to hold inner pawl 140 when pawls of lock assembly 120 is required to be extended/erected to engage with unit loading devices.

In the illustrated embodiment, the inner pawl 140 is rotatably coupled to the pawl body 132 via the shaft 150. In the illustrated embodiment, the shaft 150 passes though the pawl body 132 and the inner pawl 140 to allow the inner pawl 140 to rotate relative to the shaft. In the illustrated embodiment, springs 152 are disposed on either side of the inner pawl 140 to bias or urge the inner pawl 140 to rotate outward to rest on the inner pawl surfaces 137a, 137b. Therefore, when the pawl body 132 is in an extended position, the springs 152 bias the inner pawl 140 to the extended position to allow the inner pawl Z restraint surface 142 to be aligned with the Z restraint surface 139 of the pawl body 132. When the pawl body 132 is retracted, the guide surface 124 can position the inner pawl 140 against the force of the springs 152. In certain embodiments, the shaft 150 can be retained within the pawl body 132 with spring pins 156. In certain embodiments, the springs 152 can be any suitable biasing member.

Figure 4:
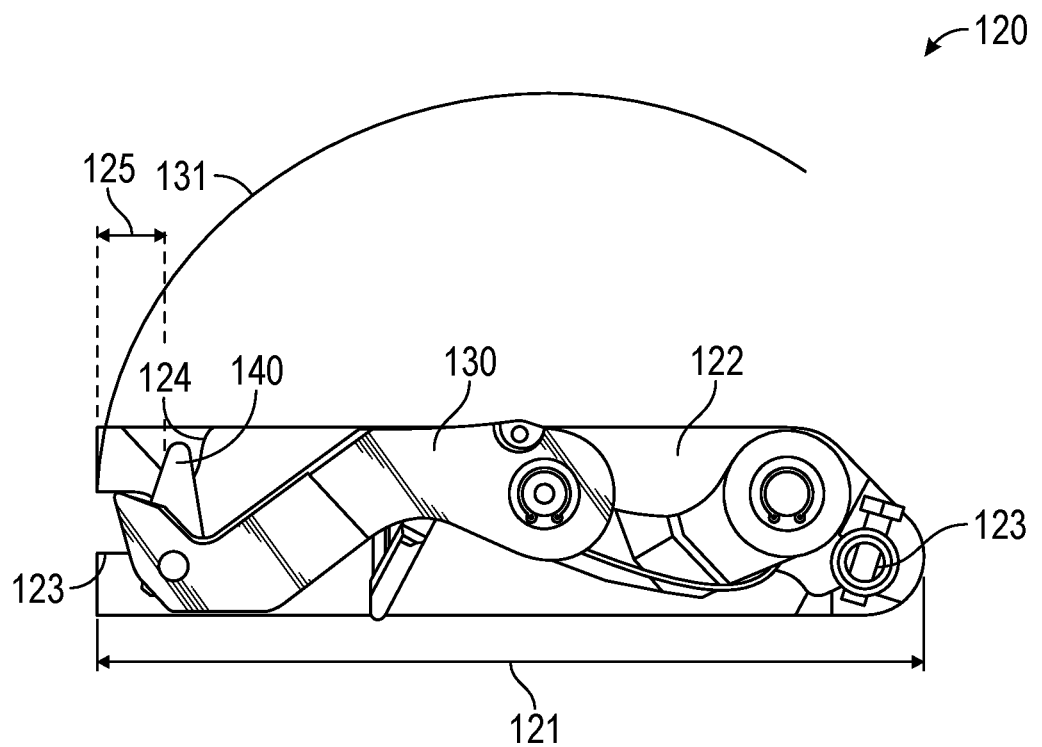
FIG. 4 is a partial elevation view of the lock assembly of FIG. 2A.

Referring to FIG. 4, the lock assembly length 121, the inner pawl clearance 125, and the outer pawl sweep envelope 131 are shown. In the illustrated embodiment, due to the use of the partial Z restraint surface 139 of the pawl body 132 and partial Z restraint surface 142 of the inner pawl 140, the inner pawl clearance 125 falls within the outer pawl sweep envelope 131. Therefore, in the illustrated embodiment, greater positioning flexibility can be achieved compared to an outer pawl 130 that has a fixed z-restraint surface where in the inner pawl clearance 125 lies outside the outer pawl sweep envelope 131.

Further, due to the use of the partial Z restraint surface 139 of the pawl body 132 and partial Z restraint surface 142 of the inner pawl 140, inner pawl clearance 125 of the retracted outer pawl assembly 130 is increased and is not dependent on the position of LRU (line replaceable unit) placed next to the lock assembly 120 in cargo area (not shown). Advantageously, increased inner pawl clearance 125 allows for operators to quickly and easily access and extend the lock assembly 120 irrespective of its location in cargo area. Further, by increasing the inner pawl clearance 125, operators can utilized gloved hands and be able to extend the outer pawl assembly 130 as needed. In the illustrated embodiment, the use of the inner pawl 140 can allow for an increase of 0.8 inches of clearance for operators.

Figure 5B:
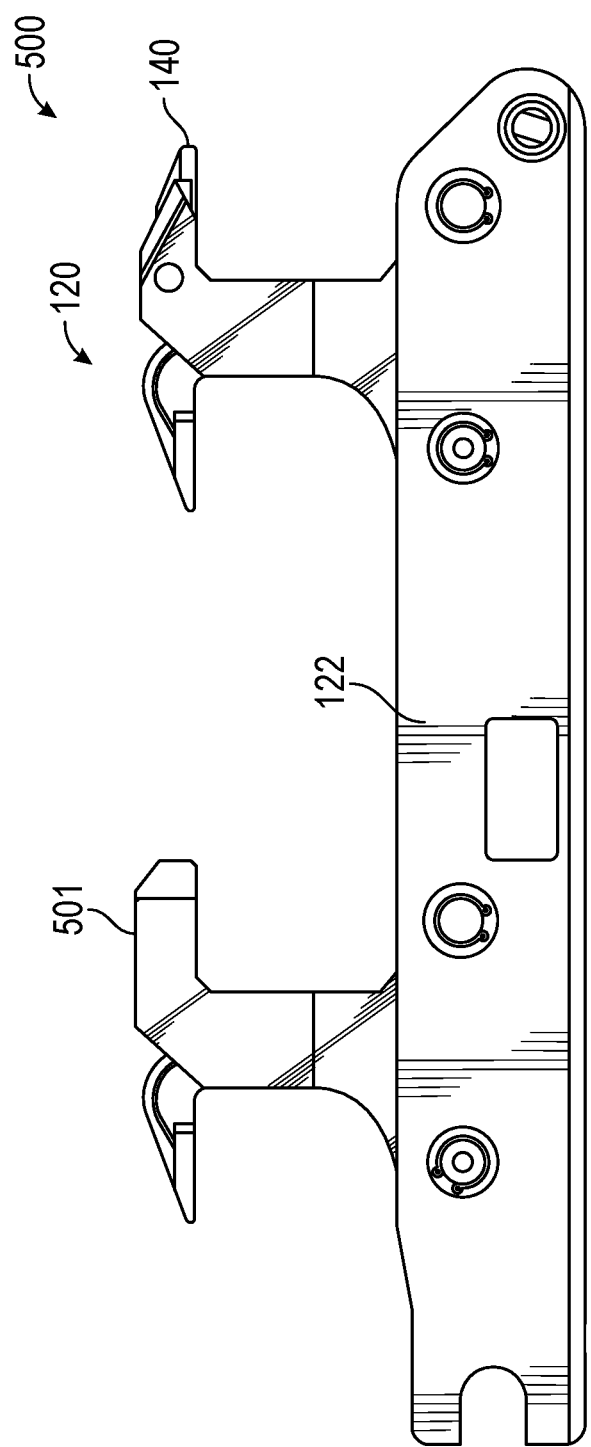
FIG. 5B is a partial elevation view of a combined lock assembly of FIG. 5A with the pawls in an extended position.

Referring to FIG. 5A, a combined lock assembly 500 is shown. In the illustrated embodiment, the combined lock assembly 500 includes two lock assemblies 120 and 501 having common side plate 122. In FIG. 5A, the inner pawl 140 is shown in a retracted position as the lock assembly 120 is in the retracted position. Advantageously, the retracted position of the inner pawl 140 allows for the secondary lock assembly 501 to be located closer to the lock assembly 120 while allowing for clearance and operation of both pawls. In FIG. 5B, the lock assembly 120 is shown extended, with the inner pawl 140 aligned with the Z restraint surface of the lock assembly 120.

Figure 6A:
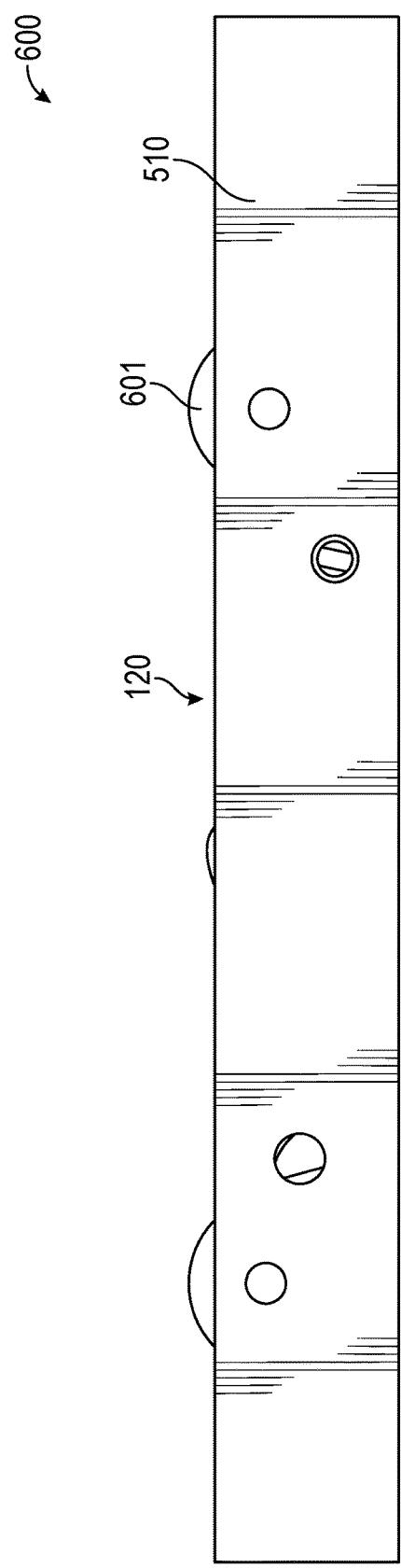
FIG. 6A is an elevation view of an embodiment of a tray assembly with the lock assembly in a retracted position.
Figure 6B:
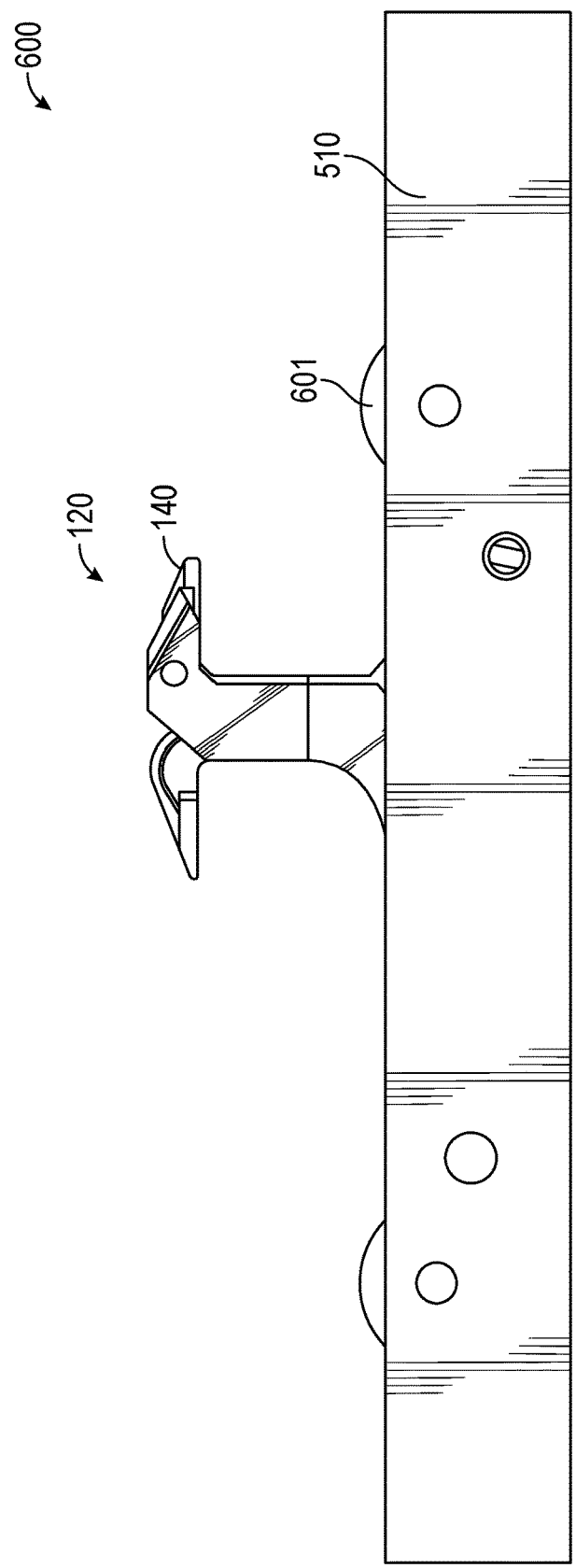
FIG. 6B is an elevation view of the tray assembly of FIG. 6A with the lock assembly in an extended position.

Referring to FIG. 6A, a tray assembly 600 is shown. In the illustrated embodiment, the tray assembly 600 includes a lock assembly 120 within the tray 610 of the tray assembly 600, and a roller 601. In FIG. 6A, the lock assembly 120 is shown retracted within the tray 610. Advantageously, the retracted position of the lock assembly 120 allows for operation of the rollers 601 without interference. In FIG. 6B, the lock assembly 120 is shown extended, with the inner pawl 140 aligned with the Z restraint surface of the lock assembly 120 to restrain unit loading devices which are not shown.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A lock assembly comprising:
    a pawl body having first restraint surface and a second restraint surface, wherein the pawl body rotates between an extended position and a retracted position;
    an inner pawl rotatably coupled to the pawl body, wherein the inner pawl comprises protrusions and is rotated away from the second restraint surface in the retracted position of the pawl body;
    a biasing member associated with the inner pawl; and
    side plates on either side of the pawl body, each of the side plates comprising a guide surface,
    wherein:
    the biasing member urges the inner pawl to be aligned with the second restraint surface in the extended position of the pawl body, and
    the protrusions respectively engage the guide surface of each of the side plates as the pawl body is retracted such that the guide surfaces guide the inner pawl away from the second restraint surface.

2. The lock assembly of claim 1, wherein the first restraint surface is along an X or Y plane.

3. The lock assembly of claim 1, wherein the second restraint surface is along a Z plane.

4. The lock assembly of claim 1, wherein the first restraint surface and the second restraint surface are perpendicular.

5. The lock assembly of claim 1, wherein the guide surface of each of the side plates is a recessed area configured to receive a corresponding one of the protrusions.

6. The lock assembly of claim 1, wherein the pawl body rotates about a pivot hole of the pawl body.

7. The lock assembly of claim 1, wherein the biasing member is a spring.

8. The lock assembly of claim 7, wherein the spring is a torsion spring.

9. The lock assembly of claim 1, further comprising a shaft disposed through the pawl body and the inner pawl to rotatably couple the inner pawl to the pawl body.

10. The lock assembly of claim 9, further comprising a spring pin to retain the shaft.

11. The lock assembly of claim 1, wherein the inner pawl includes an inner pawl restraint surface.

12. The lock assembly of claim 11, wherein the inner pawl restraint surface is aligned with the second restraint surface in the extended position of the pawl body.

13. The lock assembly of claim 1, wherein the inner pawl includes a gripping pocket.

14. The lock assembly of claim 1, wherein the pawl body includes an inner pawl surface which receives the inner pawl.

15. A cargo handling system for use with a unit load device, the cargo handling system comprising:
    a lock assembly, including:
    a pawl body having first restraint surface and a second restraint surface, wherein the pawl body rotates between an extended position and a retracted position;
    an inner pawl rotatably coupled to the pawl body, wherein the inner pawl comprises protrusions and is rotated away from the second restraint surface in the retracted position of the pawl body; and
    a biasing member associated with the inner pawl; and
    side plates on either side of the pawl body, each of the side plates comprising a guide surface,
    wherein:
    the biasing member urges the inner pawl to be aligned with the second restraint surface in the extended position of the pawl body,
    the unit load device engages the pawl body and the inner pawl when the pawl body is in the extended position, and
    the protrusions respectively engage the guide surface of each of the side plates as the pawl body is retracted such that the guide surfaces guide the inner pawl away from the second restraint surface.

16. The cargo handling system of claim 15, wherein the cargo handling system is a tray assembly.

17. The cargo handling system of claim 16, wherein the tray assembly further includes a roller.

18. The cargo handling system of claim 15, wherein the cargo handling system is a panel assembly.

19. The cargo handling system of claim 15, wherein the lock assembly is adjacent to a secondary pawl.

* * * * *